United States Patent
Grossheim

(10) Patent No.: US 11,807,317 B2
(45) Date of Patent: Nov. 7, 2023

(54) METHOD FOR OPERATING A VEHICLE

(71) Applicant: Robert Bosch GmbH, Stuttgart (DE)

(72) Inventor: Reinhard Grossheim, Abtsgmuend (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/756,056

(22) PCT Filed: Sep. 28, 2020

(86) PCT No.: PCT/EP2020/077036
§ 371 (c)(1),
(2) Date: May 16, 2022

(87) PCT Pub. No.: WO2021/099015
PCT Pub. Date: May 27, 2021

(65) Prior Publication Data
US 2023/0033041 A1    Feb. 2, 2023

(30) Foreign Application Priority Data
Nov. 20, 2019   (DE) ............... 10 2019 217 922.3

(51) Int. Cl.
*B62D 5/04*    (2006.01)

(52) U.S. Cl.
CPC ........... *B62D 5/0484* (2013.01); *B62D 5/049* (2013.01)

(58) Field of Classification Search
CPC ...... B62D 5/0484; B62D 5/049; B62D 6/007; B62D 15/025; B62D 1/286
See application file for complete search history.

(56) References Cited

U.S. PATENT DOCUMENTS 5,067,935 A * 11/1991 Brown ............... B60K 23/0808
                                                  475/248
5,835,870 A * 11/1998 Kagawa ................. B62D 1/28
                                                  701/41

(Continued)

FOREIGN PATENT DOCUMENTS

CN   106103849 A  * 11/2016  ............. B62D 6/003
CN   106133250 A  * 11/2016  ............ B62D 11/183

(Continued)

OTHER PUBLICATIONS

"Incentive shared trajectory control for highly-automated driving," Judalet et al. 2013 IEEE Intelligent Vehicles Symposium (IV) (pp. 1089-1094); Jun. 1, 2013. (Year: 2013).*

(Continued)

*Primary Examiner* — Khoi H Tran
*Assistant Examiner* — Jorge O Peche
(74) *Attorney, Agent, or Firm* — Maginot, Moore & Beck LLP

(57) ABSTRACT

A method is for operating a vehicle. The vehicle includes a steering system with at least one steering handle and at least one steering sensor operatively connected to the steering handle and configured to at least detect a driver intervention in an automated drive operating mode. In at least one faulty operating state, in which the vehicle is in the automated drive operating mode and a malfunction and/or a disturbance of the steering sensor is ascertained and/or a steering sensor signal of the steering sensor is ascertained, the steering sensor signal correlating in particular to the driver intervention, an interruption process is initiated in order to discontinue the automated drive operating mode. During the interruption process, at least one wheel steering angle characteristic variable of at least one vehicle wheel of the (Continued)

US 11,807,317 B2

Page 2 vehicle is ascertained and taken into consideration while discontinuing the automated drive operating mode.

14 Claims, 2 Drawing Sheets

(56) References Cited

U.S. PATENT DOCUMENTS

| | | | | |
|---|---|---|---|---|
| 6,050,359 | A * | 4/2000 | Mouri | B62D 6/00 180/168 |
| 6,502,908 | B1 * | 1/2003 | Mueller | B60W 30/17 303/191 |
| 11,597,402 | B2 * | 3/2023 | Gordon | B60W 40/10 |
| 2006/0287826 | A1 * | 12/2006 | Shimizu | B60Q 9/007 701/431 |
| 2007/0288142 | A1 * | 12/2007 | Maeda | B62D 1/286 701/41 |
| 2007/0288143 | A1 * | 12/2007 | Arima | B62D 15/0285 701/41 |
| 2007/0288144 | A1 * | 12/2007 | Arima | B62D 15/0285 701/41 |
| 2007/0288145 | A1 * | 12/2007 | Maeda | B62D 15/0285 701/41 |
| 2008/0051959 | A1 * | 2/2008 | Ishihara | B62D 5/046 701/41 |
| 2012/0130593 | A1 * | 5/2012 | Davis | B62D 1/286 701/41 |
| 2013/0253767 | A1 * | 9/2013 | Lee | B60W 50/04 701/41 |
| 2013/0311045 | A1 * | 11/2013 | Tanimoto | B62D 5/0466 701/42 |
| 2014/0022070 | A1 * | 1/2014 | Golomb | B60Q 1/0082 340/475 |
| 2014/0055615 | A1 * | 2/2014 | Chen | B62D 15/028 348/148 |
| 2014/0058656 | A1 * | 2/2014 | Chen | B62D 15/0285 701/400 |
| 2015/0191198 | A1 * | 7/2015 | Perichon | G05G 5/16 29/428 |
| 2015/0259882 | A1 * | 9/2015 | Sharma | E02F 9/225 701/41 |
| 2016/0132055 | A1 * | 5/2016 | Matsuno | B60W 10/184 701/23 |
| 2016/0339915 | A1 * | 11/2016 | Kuwahara | B60W 50/10 |
| 2016/0368522 | A1 * | 12/2016 | Lubischer | B62D 1/105 |
| 2017/0008557 | A1 * | 1/2017 | Mitsumoto | B62D 5/0463 |
| 2017/0066473 | A1 * | 3/2017 | Yu | B62D 6/10 |
| 2017/0240182 | A1 * | 8/2017 | Hatano | B60W 10/18 |
| 2017/0240186 | A1 * | 8/2017 | Hatano | B60W 30/095 |
| 2018/0154936 | A1 | 6/2018 | Yamasaki et al. | |
| 2018/0181132 | A1 * | 6/2018 | Kunihiro | G05D 1/0088 |
| 2018/0186406 | A1 * | 7/2018 | Itou | B62D 5/0463 |
| 2018/0201310 | A1 * | 7/2018 | Rotole | B62D 5/12 |
| 2018/0257648 | A1 * | 9/2018 | Katoh | B62D 15/025 |
| 2018/0297631 | A1 * | 10/2018 | Miyatani | B62D 6/00 |
| 2018/0312161 | A1 * | 11/2018 | Asakura | B60W 10/00 |
| 2018/0362080 | A1 * | 12/2018 | Shimizu | B60W 50/14 |
| 2019/0071112 | A1 * | 3/2019 | Toddenroth | B60R 21/215 |
| 2019/0202496 | A1 * | 7/2019 | Menjak | G05D 1/0088 |
| 2019/0263263 | A1 * | 8/2019 | Shimotani | B60K 35/00 |
| 2019/0276050 | A1 * | 9/2019 | Mega | B60K 37/02 |
| 2020/0156698 | A1 * | 5/2020 | Tsubaki | B62D 5/0463 |
| 2020/0201343 | A1 * | 6/2020 | Wang | G06V 10/803 |
| 2020/0277006 | A1 * | 9/2020 | Zhang | B62D 5/0487 |
| 2021/0101638 | A1 * | 4/2021 | Obermüller | B60W 50/08 |
| 2021/0284262 | A1 * | 9/2021 | Sardes | B60K 23/00 |
| 2021/0323579 | A1 * | 10/2021 | Kim | G05D 1/0061 |
| 2021/0347406 | A1 * | 11/2021 | Kim | B62D 5/0463 |
| 2021/0382487 | A1 * | 12/2021 | Kim | B62D 5/0493 |
| 2021/0394789 | A1 * | 12/2021 | Ji | G06N 7/01 |
| 2022/0009549 | A1 * | 1/2022 | Kim | G01P 3/481 |
| 2022/0141426 | A1 * | 5/2022 | Kim | G06V 20/56 348/148 |
| 2022/0144336 | A1 * | 5/2022 | Kim | G05B 13/024 |
| 2022/0234580 | A1 * | 7/2022 | Inaba | G08G 1/16 |
| 2022/0242428 | A1 * | 8/2022 | Sutton | B60W 10/04 |
| 2023/0033041 | A1 * | 2/2023 | Grossheim | B62D 5/049 |
| 2023/0110341 | A1 * | 4/2023 | Streiter | B60W 30/0956 701/23 |
| 2023/0126269 | A1 * | 4/2023 | Kim | B62D 15/021 701/23 |

FOREIGN PATENT DOCUMENTS

| | | | | |
|---|---|---|---|---|
| CN | 106256643 | A * | 12/2016 | B60W 50/0098 |
| CN | 106515849 | A * | 3/2017 | B62D 15/025 |
| CN | 107776656 | A * | 3/2018 | B60W 30/12 |
| CN | 109415055 | A * | 3/2019 | B60W 30/09 |
| CN | 109421794 | A * | 3/2019 | B60R 21/01538 |
| CN | 110248854 | A * | 9/2019 | B60T 13/581 |
| CN | 113460152 | A * | 10/2021 | B62D 5/0463 |
| DE | 4224887 | A1 * | 9/1993 | B60T 11/21 |
| DE | 199 52 227 | A1 | 9/2000 | |
| DE | 102014007607 | A1 * | 12/2014 | B62D 15/025 |
| DE | 102015004745 | A1 * | 10/2016 | |
| DE | 102017220069 | A1 * | 5/2019 | B62D 5/0481 |
| DE | 102015004745 | B4 * | 10/2019 | |
| DE | 102019202627 | B3 * | 4/2020 | B62D 5/0484 |
| DE | 102019217922 | A1 * | 5/2021 | B62D 15/025 |
| DE | 102020203622 | A1 * | 9/2021 | |
| EP | 2647546 | A1 * | 10/2013 | B62D 15/0245 |
| EP | 3 366 549 | A1 | 8/2018 | |
| EP | 3875349 | A1 * | 9/2021 | B62D 5/04 |
| GB | 2481885 | A * | 1/2012 | B62D 1/286 |
| JP | 2005067322 | A * | 3/2005 | B60T 8/17557 |
| JP | 3881775 | B2 * | 2/2007 | B62D 1/286 |
| JP | 2018062321 | A * | 4/2018 | B60K 31/0008 |
| JP | 2018177120 | A * | 11/2018 | B62D 1/286 |
| KR | 20180068980 | A | 6/2018 | |
| KR | 20220144460 | A * | 10/2022 | |
| WO | 2004/022414 | A1 | 3/2004 | |
| WO | WO-2016208399 | A1 * | 12/2016 | B62D 1/286 |
| WO | WO-2018038110 | A1 * | 3/2018 | B62D 15/0235 |
| WO | WO-2018051838 | A1 * | 3/2018 | B62D 15/021 |
| WO | WO-2021099015 | A1 * | 5/2021 | B62D 15/025 |

OTHER PUBLICATIONS

"Fault Injection in Model-Based System Failure Analysis of Highly Automated Vehicles," Salih et al., IEEE Open Journal of Intelligent Transportation Systems (vol. 2, pp. 417-428); Oct. 26, 2021. (Year: 2021).*

"Recent Developments in the Vehicle Steer-by-Wire System," Mortazavizadeh et al. IEEE Transactions on Transportation Electrification (vol. 6, Issue: 3, pp. 1226-1235), Jun. 24, 2020. (Year: 2020).*

International Search Report corresponding to PCT Application No. PCT/EP2020/077036, dated Jan. 21, 2021 (German and English language document) (5 pages).

* cited by examiner

METHOD FOR OPERATING A VEHICLE

This application is a 35 U.S.C. § 371 National Stage Application of PCT/EP2020/077036, filed on Sep. 28, 2020, which claims the benefit of priority to Serial No. DE 10 2019 217 922.3, filed on Nov. 20, 2019 in Germany, the disclosures of which are incorporated herein by reference in their entirety.

BACKGROUND

The disclosure is based on a method for operating a vehicle. In addition, the disclosure relates to a control unit with a computing unit for carrying out such a method and a vehicle with a computing unit for carrying out such a method.

From the prior art, vehicles are known in which a change can be carried out between a manual driving operating mode and an automated driving operating mode. To exit the automated driving operating mode, a steering sensor signal from a steering sensor is usually monitored. In the event of a detected error in the steering sensor signal, the automated driving operating mode must be exited and the driver must take over the control of the vehicle, in particular by manual operation of a steering control of the vehicle. In this context, reference should be made, for example, to the generic EP 3 366 549 A1.

However, a sudden exit from the automated driving operating mode, especially during cornering of the vehicle, can lead to impairments in the steering feel perceptible to the driver, as this creates a sudden, steep rise in a manual torque perceptible on the steering control.

The object of the disclosure is in particular to use a method with improved characteristics in terms of the steering feel. The object is achieved by the features disclosed herein, while advantageous embodiments and developments of the disclosure can be taken from the subordinate claims.

SUMMARY

The disclosure is based on a method for operating a vehicle, in particular a motor vehicle, wherein the vehicle has a steering system with at least one steering control, for example in the form of a steering wheel, and with at least one steering sensor operatively connected to the steering control, which is provided at least for the detection of a driver intervention in an automated driving operating mode, and wherein in at least one faulty operating state in which the vehicle is in automated driving operating mode and a fault and/or a malfunction of the steering sensor and/or a steering sensor signal of the steering sensor, correlated in particular with a driver intervention, is determined, a termination process is initiated to exit the automated driving operating mode.

It is proposed that in the termination process at least one wheel steering angle characteristic parameter of at least one vehicle wheel of the vehicle is determined and taken into account when exiting the automated driving operating mode and in particular when transitioning to a manual driving operating mode. In particular, the vehicle in this case comprises at least one automated, in particular semi-automated or advantageously highly automated, driving operating mode and at least one manual driving operating mode. The automated driving operating mode is further advantageous in at least a normal operating state, which is in particular different from the faulty operating state, in which the steering sensor is in particular functional, depending on the steering sensor signal and in particular depending on a driver intervention detected by means of the steering sensor signal. This design can improve in particular the steering feel, especially in the event of a sudden exit from the automated driving operating mode. In particular, a supporting torque and/or a steering torque provided by a steering actuator, for example, is adjusted depending on the wheel steering angle characteristic parameter and/or a transition to a manual driving operating mode is delayed at least for a short time depending on the wheel steering angle characteristic parameter.

The vehicle and advantageously the steering system comprises in particular at least one computing unit, which is provided to carry out the method for the operation of the vehicle. In addition, the vehicle and/or the steering system may comprise further components and/or assemblies, such as at least one control unit, preferably in the form of a steering control unit, at least one steering actuator operatively connected to the steering control and/or at least a sensor unit for detecting the wheel steering angle characteristic parameter. "Provided" is intended in particular to be understood as specially programmed, designed and/or equipped. By the fact that an object is provided for a certain function, it is to be understood in particular that the object fulfills and/or carries out this certain function in at least one application state and/or operational state.

A "steering sensor" is to be understood in particular as a sensor unit operatively connected to the steering control and advantageously arranged on a steering shaft of the steering system, which is provided to detect at least one item of steering information correlated with operation of the steering control and to provide a steering sensor signal correlated with the steering information. The steering information is preferably a manual torque and/or a torque, in particular applied to the steering control. In the automated driving operating mode, the steering information is at least compatible with a driver intervention, in particular in the form of the operation and/or gripping of the steering control. For the acquisition of the steering information, the steering sensor unit may also comprise in particular at least one sensor element. Furthermore, a "steering actuator" is to be understood in particular as an actuator unit, in particular of electrical and/or electronic form, which has an operative connection to at least one vehicle wheel of the vehicle and is in particular intended to provide a steering torque and thereby advantageously to influence a direction of travel of the vehicle. Preferably, the steering actuator is designed to provide a steering torque in the manual driving operating mode to support a manual torque applied to the steering control and in the automated driving operating mode to provide a steering torque for automatic and/or autonomous control of a direction of travel of the vehicle. For this purpose, the steering actuator may comprise at least one electric motor. Furthermore, a "computing unit" is to be understood in particular as an electrical and/or electronic unit, which has an information input, information processing and an information output. Advantageously, the computing unit further has at least one processor, at least one operating memory, at least one input and/or output medium, at least one operating program, at least one control routine, at least one regulating routine, at least one calculation routine and/or at least one evaluation routine. In particular, the computing unit is at least provided to determine a fault and/or a malfunction of the steering sensor and/or to determine a steering sensor signal of the steering sensor, in particular correlated with a driver intervention, and, depending on the fault and/or the malfunction, to initiate a termination process for exiting the automated driving operating mode. In addition, the computing unit is provided in particular to determine the wheel steering angle characteristic parameter and to take it into account when exiting the automated driving operating mode. Preferably, the computing unit is also integrated into a control unit of the vehicle and/or a control unit of the steering system, in particular the steering control unit.

In addition, a "wheel steering angle characteristic parameter" is to be understood in particular as a parameter which is correlated with a current wheel steering angle of at least one vehicle wheel of the vehicle. In particular, at least on the basis of the wheel steering angle characteristic parameter, a current wheel steering angle of the vehicle wheel can be concluded and/or a current wheel steering angle of the vehicle wheel can be determined. The wheel steering angle characteristic parameter can be determined in particular based on a rack and pinion position, based on a rotor position signal of the steering actuator, based on a deflection of the steering control, based on a steering angle at the steering control, based on route data of a navigation device of the vehicle and/or based on a wheel steering angle of the vehicle wheel, in particular directly detected by means of the sensor unit. A "termination process" is also to be understood in particular as a process in which, in the event of a faulty operating state, a discontinuation of the automated driving operating mode and a transition to the manual driving operating mode and/or a handover to a driver is carried out. In particular, the termination process may also have a predetermined and/or predeterminable period of time within which the handover to a driver must take place. If the driver has not taken over the steering control within the predetermined and/or predeterminable period of time, the computing unit may be provided in particular to park the vehicle on the roadside or to operate the vehicle in a degraded state, for example with a greatly reduced vehicle speed.

The wheel steering angle characteristic parameter can be taken into account in the faulty operating state and in particular when exiting the automated driving operating mode, for example in such a way that a supporting torque and/or a steering torque, in particular provided by the steering actuator, is adapted to the current wheel steering angle and/or route of the vehicle as a function of the wheel steering angle characteristic parameter, in particular to reduce the manual torque perceptible on the steering control during the takeover. However, it is advantageously proposed that the automated driving operating mode in the faulty operating state, in particular independently of a potential driver intervention, will only be exited if the value of the wheel steering angle characteristic parameter is below a predefined limit value. In particular, the automated driving operating mode in the faulty operating state thus continues until the value of the wheel steering angle characteristic parameter is below the predefined limit value. Advantageously, in the faulty operating state, a transition to the manual driving operating mode can therefore be delayed at least for a short time depending on the wheel steering angle characteristic parameter. Particularly advantageously, the wheel steering angle characteristic parameter is a current wheel steering angle, wherein the limit value is not more than 20°, preferably not more than 10° and particularly preferably not more than 5°. As a result, exiting the automated driving operating mode during cornering of the vehicle and a related steep rise of the perceptible manual torque on the steering control can be advantageously avoided.

In addition, it is proposed that in the faulty operating state a replacement signal, in particular as a replacement for the steering sensor signal, is determined. In this context, the replacement signal can be used in particular to detect a driver intervention and can be taken into account when exiting the automated driving operating mode and/or can be used in the manual driving operating mode to provide fail-safe operation. In addition, the replacement signal can also be taken into account in the normal operating state, for example for checking the plausibility of the steering sensor signal. In this way, in particular, operational safety can be increased.

The steering system may include, in particular, a redundant further sensor unit for providing the replacement signal. The further sensor unit can be in the form, for example, of a capacitive sensor unit and in particular may be integrated in the steering control. According to a particularly preferred design of the disclosure, however, it is proposed that the replacement signal is a virtual steering sensor signal and is determined as a function of a wheel steering angle, a rack and pinion force, a rack and pinion position, a yaw rate and/or a rotor signal of a steering actuator, in particular the aforementioned steering actuator. In this way, in particular an efficiency, in particular a component efficiency and/or a cost efficiency, can be improved since the replacement signal can be determined advantageously using known and/or already present operating signals of the vehicle.

The method, the control unit and the vehicle should not be limited to the application and embodiment described above. In particular, the method, the control unit, and the vehicle can include a number of individual elements, components, and units different from a number mentioned herein for the performance of a function described herein.

BRIEF DESCRIPTION OF THE DRAWINGS

Further advantages result from the following drawing description. An exemplary embodiment of the disclosure is illustrated in the drawings.

In the figures.

DETAILED DESCRIPTION

Figure 1A:
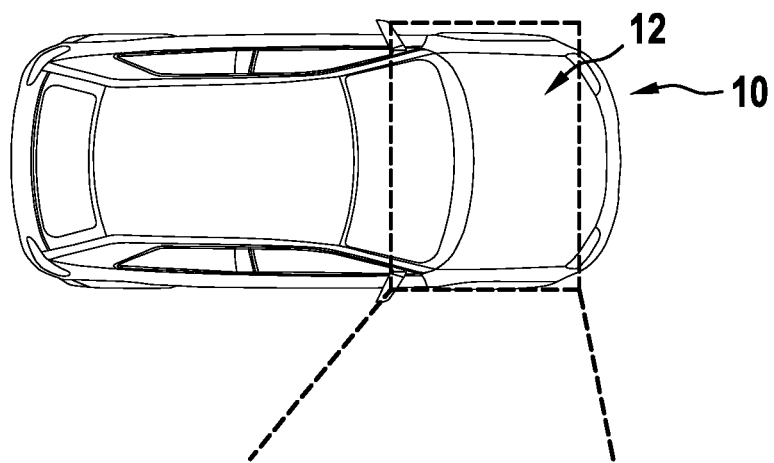
FIGS. 1a-b show a vehicle with a steering system in a simplified illustration.
Figure 1B:
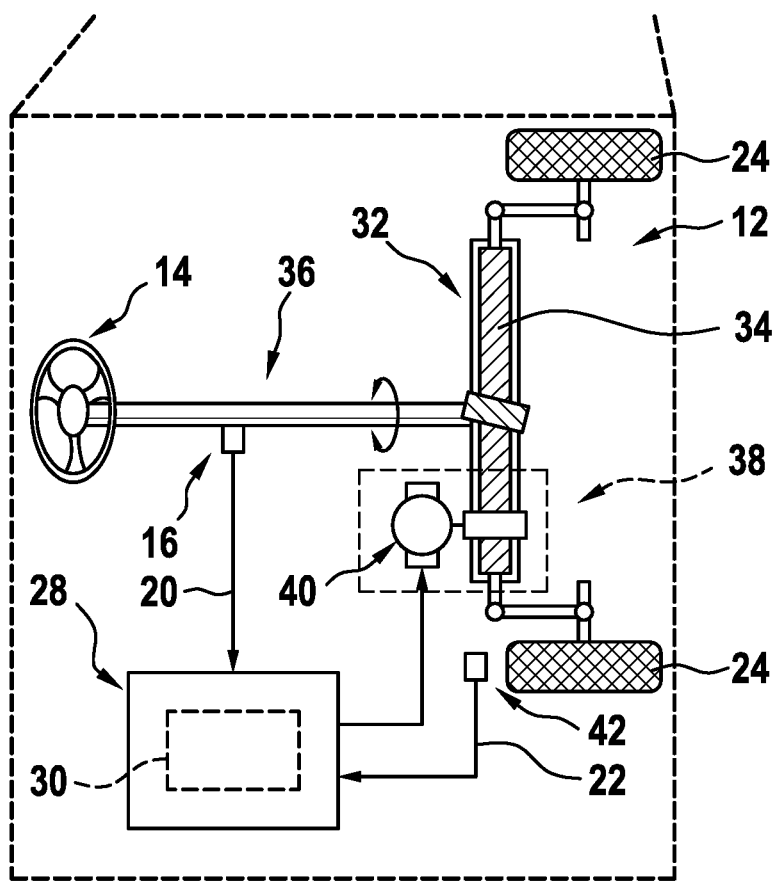

FIGS. 1a and 1b show an exemplary vehicle 10 in the form of a passenger car with multiple vehicle wheels 24 and with a steering system 12 in a simplified representation. The steering system 12 has an operative connection to the vehicle wheels 24 and is provided for influencing a driving direction of the vehicle 10. In the present case, the steering system 12 is in the form of a conventional steering system with a mechanical action. Furthermore, the steering system 12 is in the form of an electrically assisted steering system and in the present case has, in particular, an electric auxiliary steering in the form of a power steering. In addition, in the present case the vehicle 10 has, by way of example, at least two different modes of operation, in particular a manual driving operating mode 26 and an automated, advantageously highly automated, driving operating mode 18 (cf. also FIG. 2). Alternatively, a steering system could also be in the form of a steer-by-wire steering system.

The steering system 12 comprises a steering control 14, in the present case for example in the form of a steering wheel, for the application of a manual torque, a steering gear 32 in the form of a rack and pinion steering gear by way of example, which has at least one steering actuator element 34 in the form of a rack and is provided for converting a steering demand on the steering control 14 into a steering movement of the vehicle wheels 24, which in the present case are in the form in particular of front wheels, and a steering shaft 36 for in particular mechanical connection of the steering control 14 to the steering gear 32. Alternatively, a steering control could also be in the form of a steering lever and/or a steering ball or the like. In addition, a steering shaft could also only temporarily connect a steering control to a steering gear and/or may have a mechanical separation, such as in a steer-by-wire steering system.

In addition, the steering system 12 comprises a steering actuator 38. The steering actuator 38 is at least partially of electrical form. The steering actuator 38 is intended to provide a steering torque and to introduce it into the steering gear 32. In the present case, the steering actuator 38 is intended at least to provide, in manual driving operating mode 26, a steering torque in the form of a supporting torque for supporting a manual torque applied by the driver and in automated driving operating mode 18 to provide a steering torque for the direct adjustment of the vehicle wheels 24, in particular in the form of front wheels, and thereby in particular to provide the automatic and/or autonomous control of a direction of travel of the vehicle 10. For this purpose, the steering actuator 38 comprises at least one electric motor 40. The electric motor 40 is in the form of a servo motor, in this case in particular of a permanently excited synchronous motor. The electric motor 40 is coupled to the steering gear 32 and is provided for generating the steering torque. In principle, a steering actuator could also have multiple electric motors.

In addition, the steering system 12 includes a steering sensor 16. The steering sensor 16 is arranged on the steering shaft 36 and has an operative connection to the steering control 14. The steering sensor 16 is in the form of a torque sensor. The steering sensor 16 is intended to provide steering information correlated with an actuation of the steering control 14, in particular a manual torque and/or a torque applied to the steering control 14, and to provide a steering sensor signal 20 correlated with the steering information. In the automated driving operating mode 18, the steering information is linked at least to a driver intervention, in particular in the form of an actuation and/or a gripping of the steering control 14. The steering sensor 16 is therefore provided for detecting a driver intervention, at least in the automated driving operating mode 18. Alternatively, a steering sensor could also be used as a sensor which is different from a torque sensor, such as a rotation angle sensor and/or as a combined torque and rotation angle sensor.

Furthermore, the steering system 12 comprises at least one sensor unit 42. The sensor unit 42 is assigned to at least one of the vehicle wheels 24 and is provided for the detection of at least one wheel steering angle characteristic parameter 22 of the vehicle wheel 24. In the present case, the sensor unit 42 is provided for the direct detection of a wheel steering angle of the vehicle wheel 24. In principle, however, a sensor unit could also be used for detecting a rack and pinion position, a rotor position signal and/or a steering angle or the like. Furthermore, it is conceivable to completely dispense with a sensor unit and to determine a wheel steering angle characteristic parameter on the basis of internal operating signals of a control unit and/or on the basis of route data of a navigation unit of the vehicle, for example.

Furthermore, the vehicle 10 has a control unit 28. In the present case, by way of example the control unit 28 is in the form of a steering control unit and is therefore part of the steering system 12. The control unit 28 has an operative connection to the steering sensor 16, the sensor unit 42 and the steering actuator 38. The control unit 28 is provided for receiving the steering sensor signal 20 and the wheel steering angle characteristic parameter 22 and for controlling the steering actuator 38 at least depending on the steering sensor signal 20.

For this purpose, the control unit 28 comprises a computing unit 30. The computing unit 30 comprises at least one processor (not shown), for example in the form of a microprocessor, and at least one operating memory (not shown). In addition, the computing unit 30 comprises at least one operating program stored in the operating memory with at least one control routine, at least one regulating routine, at least one calculation routine and at least one evaluation routine. Alternatively, a control unit could also be different from a steering control unit and could be in the form of the central control unit of a vehicle, for example.

Figure 2:
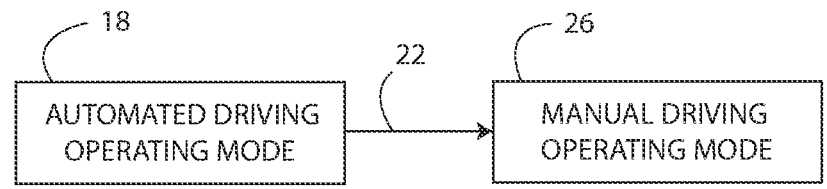
FIG. 2 shows an exemplary signal flow diagram of a method for the operation of the vehicle and FIG. 3 shows an exemplary flow diagram with the main steps of the method for the operation of the vehicle.

An exemplary method for the operation of the vehicle 10 is explained below with reference to FIGS. 2 and 3. In the present case, the computing unit 30 is provided in particular for carrying out the method and has, in particular, a computer program with corresponding program code means for this purpose.

In a normal operating state, the computing unit 30 is provided for monitoring the steering sensor signal 20 of the steering sensor 16 for exiting the automated driving operating mode 18. A transition from the automated driving operating mode 18 to the manual driving operating mode 26 thus takes place depending on the steering sensor signal 20 and in particular depending on a driver intervention detected by means of the steering sensor signal 20.

However, if a malfunction of the steering sensor 16 and/or an error in the steering sensor signal 22 occurs, a driver intervention can no longer be reliably determined on the basis of the steering sensor signal 20, so that the automated driving operating mode 18 is exited and the driver has to take over control of the vehicle 10.

However, a sudden exit from automated driving operating mode 18 in this case, in particular during cornering by the vehicle 10, may lead to impairments of the steering feel perceptible by the driver, since a sudden steep rise of a manual torque perceptible on the steering control 14 is produced in this way.

For this reason, it is proposed that at least in a fault operation state in which the vehicle 10 is in the automated driving operating mode 18 and a fault and/or malfunction of the steering sensor 16 and/or the steering sensor signal 20 is detected, a termination operation for exiting the automated driving operating mode 18 is initiated. According to the disclosure, the wheel steering angle characteristic parameter 22 is determined during the termination process and when exiting the automated driving operating mode 18 and in particular when transitioning to the manual driving operating mode 26. The wheel steering angle characteristic parameter 22 corresponds by way of example to a current wheel steering angle of at least one of the vehicle wheels 24.

In the present case, the automated driving operating mode 18 is only exited in the faulty operating state, in particular regardless of a potential driver intervention, if the wheel steering angle characteristic parameter 22 is lower than a predefined limit value, which in particular is no greater than 5°. As a result, in the faulty operating state, a transition from the automated driving operating mode 18 to the manual driving operating mode 26 is at least delayed for a short time depending on the wheel steering angle characteristic parameter 22. Alternatively, however, the limit value could have a different value, such as no greater than 10° or no greater than 3°. In addition, a wheel steering angle characteristic parameter could also be taken into account in a faulty operating state and in particular when exiting an automated driving operating mode, in such a way that a supporting torque and/or a steering torque, in particular provided by a steering actuator, is adapted to a current wheel steering angle and/or a route of a vehicle depending on the wheel steering angle characteristic parameter.

A replacement signal for the steering sensor signal 20 is also preferably determined at least in the faulty operating state. In the present case, the replacement signal is a virtual steering sensor signal and is determined depending on the wheel steering angle of at least one of the vehicle wheels 24, a rack and pinion force correlated with the steering control element 34, a rack and pinion position correlated with the steering control element 34, a yaw rate of the vehicle 10 and/or a rotor position signal of the steering actuator 38. As a result, the replacement signal can advantageously be determined using already existing operating signals of the vehicle 10. On the one hand, the replacement signal can be used for detecting a driver intervention and can be taken into account when exiting the automated driving operating mode 18, and on the other hand can be used for providing fail-safe operation in the manual driving operating mode, for example operation of the vehicle 10 in a degraded state, in particular with a reduced vehicle speed. With regard to further implementations for the determination of a virtual steering sensor signal, refer in particular to WO 2004/022414 A1. In principle, a replacement signal could also be determined alternatively by means of a redundant, additional sensor unit, such as a capacitive sensor unit integrated into a steering control.

Figure 3:
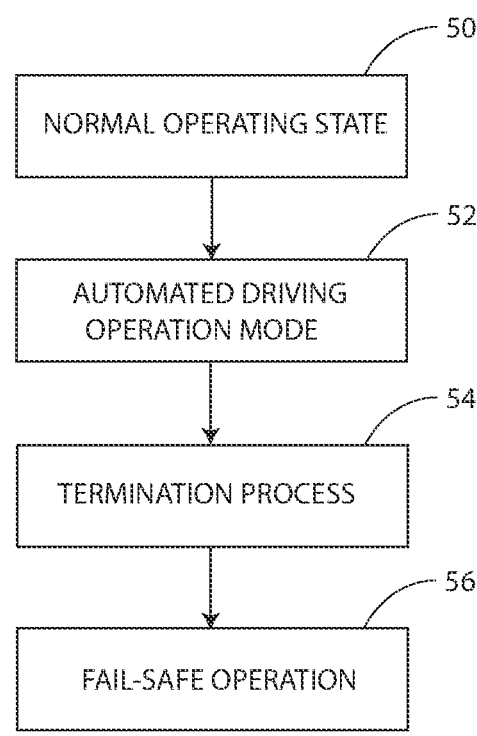

Finally, FIG. 3 shows an exemplary flowchart with the main steps of the method for the operation of the vehicle 10.

A step 50 of the method corresponds to a normal operating state in which the steering sensor signal 20 of the steering sensor 16 is monitored for exiting the automated driving operating mode 18 and a transition from the automated driving operating mode 18 to the manual driving operating mode 26 is thus carried out depending on the steering sensor signal 20 and in particular depending on a driver intervention detected by means of the steering sensor signal 20.

In a step 52 of the method, the vehicle 10 is in the automated driving operating mode 18. If, in this case, a malfunction of the steering sensor 16 and/or an error in the steering sensor signal 22 occurs, a driver intervention can no longer be reliably detected on the basis of the steering sensor signal 20, so that the automated driving operating mode 18 must be exited.

A step 54 of the method corresponds to a termination process which is initiated when the vehicle 10 is in the automated driving operating mode 18 and a fault and/or a malfunction of the steering sensor 16 and/or of the steering sensor signal 20, correlated in particular with a driver intervention, occurs. In this case, the wheel steering angle characteristic parameter 22 is determined and is taken into account on exiting the automated driving operating mode 18 and in particular when switching to the manual driving operating mode 26, in particular in a manner such that the automated driving operating mode 18 in the faulty operating state, in particular regardless of a potential driver intervention, is only exited if the wheel steering angle characteristic parameter 22 is below the predefined limit value.

In the present case, a step 56 of the method corresponds to fail-safe operation. After the transition from the automated driving operating mode 18 to the manual driving operating mode 26, the vehicle 10 is operated further in a degraded state using the replacement signal.

The exemplary flow diagram in FIG. 3 is intended in particular to describe only an exemplary method for the operation of the vehicle 10. In particular, individual steps of the method may also vary. In this context, it is also conceivable, for example, to dispense with a step 56 of the method.

The invention claimed is:

1. A method for operation of a vehicle, the vehicle comprising a steering system with at least one steering control and at least one steering sensor operatively connected to the at least one steering control, the method comprising:
   operating the vehicle in an automated driving operating mode of the vehicle;
   identifying a faulty operating state in which the vehicle is in the automated driving operating mode and a fault and/or a malfunction of the at least one steering sensor and/or of a steering sensor signal of the at least one steering sensor is determined; and
   initiating a termination process for terminating the automated driving operating mode when the faulty operating state is identified, the termination process including (i) determining at least one wheel steering angle characteristic parameter of at least one vehicle wheel of the vehicle and (ii) exiting the automated driving operating mode based on the determined at least one wheel steering angle characteristic parameter.

2. The method as claimed in claim 1, wherein exiting the automated driving operation mode comprises:
   exiting the automated driving operating mode in the faulty operating state only when a value of the at least one wheel steering angle characteristic parameter is below a predefined limit.

3. The method as claimed in claim 2, wherein:
   the at least one wheel steering angle characteristic parameter is a current wheel steering angle of the vehicle, and the predefined limit is no greater than 10°.

4. The method as claimed in claim 1, further comprising:
   determining, in the faulty operating state, a replacement signal for the steering sensor signal.

5. The method as claimed in claim 4, further comprising:
   using the replacement signal for detecting a driver intervention; and
   wherein the exiting the automated driving operating mode is further based on the replacement signal.

6. The method as claimed in claim 4, further comprising:
   using the replacement signal to provide fail-safe operation in a manual driving operating mode of the vehicle.

7. The method as claimed in claim 4, wherein:
   the replacement signal is a virtual steering sensor signal, and
   the replacement signal is determined depending on a wheel steering angle, a rack and pinion force, a rack and pinion position, a yaw rate, and/or a rotor position signal of a steering actuator.

8. A steering control unit of a steering system of a vehicle, the steering system further including at least one steering sensor operatively connected to the steering control unit, the steering control unit comprising:
   a computing unit configured to:

detect a driver intervention in an automated driving operating mode of the vehicle using the at least one steering sensor;

initiate a termination process for exiting the automated driving operation mode in at least a faulty operating state in which the vehicle is in the automated driving operating mode and a fault and/or a malfunction of the at least one steering sensor and/or of a steering sensor signal of the at least one steering sensor, correlated with the driver intervention, is determined;

determine, during the termination process, at least one wheel steering angle characteristic parameter of at least one vehicle wheel of the vehicle; and exit the automated driving operating mode in the faulty operating state only when a value of the determined at least one wheel steering angle characteristic parameter is below a predefined limit.

9. A vehicle comprising:

a steering system including at least one steering control unit and at least one steering sensor operatively connected to the steering control unit, the steering control unit including a computing unit, wherein the computing unit is configured to:

operate the vehicle in an automated driving operating mode of the vehicle;

identify a faulty operating state in which the vehicle is in the automated driving operating mode and a fault and/or a malfunction of the at least one steering sensor and/or of a steering sensor signal of the at least one steering sensor is determined; and initiate a termination process for terminating the automated driving operating mode when the faulty operating state is identified, the termination process including (i) determining at least one wheel steering angle characteristic parameter of at least one vehicle wheel of the vehicle and (ii) exiting the automated driving operating mode based on the determined at least one wheel steering angle characteristic parameter.

10. The steering control unit as claimed in claim 8, wherein:

the at least one wheel steering angle characteristic parameter is a current wheel steering angle of the vehicle, and the predefined limit is no greater than 10°.

11. The steering control unit as claimed in claim 8, further comprising:

determining, in the faulty operating state, a replacement signal for the steering sensor signal.

12. The steering control unit as claimed in claim 11, further comprising:

using the replacement signal for detecting a driver intervention; and wherein the exiting the automated driving operating mode is further based on the replacement signal.

13. The steering control unit as claimed in claim 11, further comprising:

using the replacement signal to provide fail-safe operation in a manual driving operating mode of the vehicle.

14. The steering control unit as claimed in claim 11, wherein:

the replacement signal is a virtual steering sensor signal, and the replacement signal is determined depending on a wheel steering angle, a rack and pinion force, a rack and pinion position, a yaw rate, and/or a rotor position signal of a steering actuator.

* * * * *